United States Patent [19]

Anderson et al.

[11] 4,356,043

[45] Oct. 26, 1982

[54] CUTTING TOOL CARRIER AND METHOD OF CUTTING

[75] Inventors: Harry E. Anderson, Pittsburgh; Raymond E. Heasley, McKees Rocks, both of Pa.

[73] Assignee: Anderson Engineers, Inc., Carnegie, Pa.

[21] Appl. No.: 297,401

[22] Filed: Aug. 28, 1981

[51] Int. Cl.³ .............................................. B23K 7/10
[52] U.S. Cl. .................................... 148/9 R; 266/62; 266/69; 266/73; 266/77
[58] Field of Search .................. 148/9 R; 266/77, 62, 266/69, 73

[56] References Cited

U.S. PATENT DOCUMENTS

| | | | |
|---|---|---|---|
| 2,184,560 | 12/1939 | Moss | 148/9 |
| 2,202,130 | 5/1940 | Wagner | 148/9 |
| 2,288,026 | 6/1942 | Rea | 148/9 |
| 2,293,853 | 8/1942 | Rountree | 266/23 |
| 2,492,526 | 12/1949 | Geibig | 158/27.4 |
| 2,665,900 | 1/1954 | Begerow | 266/77 |
| 3,701,692 | 10/1972 | Wright | 148/9 R |
| 3,783,036 | 1/1974 | Ulrichsen | 148/9 R |
| 3,868,095 | 2/1975 | Bauer et al. | 266/23 K |
| 4,092,016 | 5/1978 | Roeder | 266/77 |
| 4,179,101 | 12/1979 | Brautigam | 266/77 |

Primary Examiner—W. Stallard
Attorney, Agent, or Firm—Webb, Burden, Robinson & Webb

[57] ABSTRACT

A cutting tool carrier for holding a plurality of cutting tools, each tool requiring certain utilities to operate. The carrier includes a body, a plurality of tool holders pivotally mounted within the body and each adapted to receive a cutting tool, first pivot means enabling the body to be rotated about the axis of a first tool holder, second pivot means for rotating each of the remaining tool holders within the body, control means for transmitting control signals for the second pivot means through the first tool holder, said control means operative continuously regardless of any motion between the first tool holder and the body, and utility means for transmitting tool utilities first through the first tool holder, then through the body, and then through each of the remaining tool holders, said utility means operative continuously regardless of any motion between the tool holders and the body. A cutting tool carrier in combination with a pair of cutting torches mounted therein and a method of making a straight cut and a bevel cut in a workpiece with one pass of the carrier are also disclosed.

33 Claims, 20 Drawing Figures

CUTTING TOOL CARRIER AND METHOD OF CUTTING

BACKGROUND

(1) Field of the Invention

This invention pertains to cutting tool carriers, to tool carriers adapted to receive a plurality of cutting torches and more particularly to double torch carriers in which a second torch is pivotable about a first torch and can follow a cut made by the first torch. This invention also relates to a method of making a plurality of cuts in a workpiece with one pass of a cutting tool carrier.

(2) Description of the Prior Art

The manufacture of a variety of metal products requires that two pieces of sheet metal be butt welded together along adjoining edges. For many applications, such as shipbuilding, the edges of the metal to be joined must be beveled in order to hold a sufficient quantity of the welding metal to make a strong joint. The "V" formed between the abutting pieces of metal in the beveled area creates a reservoir for the welding metal. This reservoir is not attainable when the adjoining edges of the metal are straight.

Such metal pieces to be joined are usually cut to the desired shape from a larger workpiece. The workpiece is cut by moving a cutting tool, such as an oxy-acetylene or plasma torch, across the metal in the desired contour. This is typically accomplished by rigidly mounting the cutting tool to a movable carriage assembly. This cut produces a substantially straight edge. The beveling of the edges is done either by hand, by nibbler machine, or by moving an angled torch over the same contour in a second pass with the movable carriage assembly. A substantial amount of production time can be saved if both the contour and the bevel cuts could be made with one pass over the workpiece.

It is accordingly an object of this invention to provide an apparatus and a method for making a plurality of cuts in a workpiece with one pass over the workpiece.

One example of a tool satisfactory for cutting a workpiece is the Thermal Dynamics PCH/M-5A Cutting Torch which, with the appropriate tip, can make either straight or bevel cuts in a metal plate. This device is referred to generally as a plasma torch. In such a plasma torch an electric arc is used to melt the material being cut and a jet of hot gas, called plasma, blows the molten material away. Both the electric arc and the jet of hot gas come out of the cutting tip of the torch. This torch is capable of cutting any electrically conductive material at high speed. The utilities needed for the PCH/M-5A torch are direct current power, cooling water, gas for the plasma, referred to as the cutting gas, and a shield gas. Typically argon is used for the cutting gas, and argon, helium, carbon dioxide, an argon-hydrogen mixture, or an argon-helium mixture is used as the shield gas. Plasma torches operate by injecting the cutting gas tangentially into an electric arc formed between electrodes in a chamber near the tip of the torch. The shield gas surrounds the electric arc and plasma. The details of the construction and operation of plasma torches are well known in the art.

Double torch cutting devices which have both a straight and also a bevel cutting torch rigidly mounted together are known in the art. See, e.g, U.S. Pat. Nos. 4,179,101; 2,202,130; 3,868,095; 4,092,016; 2,293,853; and 2,492,526. In these devices, the tips of the torches are located closely together and make both the straight and angle cut at the same time. However, to accurately cut intricate and curved patterns, it is necessary to have the lead or straight cut made first, with the bevel cut made by the second torch following, a bit delayed, along the cut made by the first torch. In order to make both cuts with one pass, only one movable carriage assembly may be used.

Accordingly, it is an object of this invention to provide a cutting tool carrier to hold both cutting tools wherein the second, following cutting tool is pivotable about the lead cutting tool.

It is a further object of the invention to provide a cutting tool carrier wherein the tip of the following cutting tool is pivotable in order to make the bevel cut with a constant angle.

When a torch is used as the cutting tool, it requires its own utilities, such as gas, water, and electrical power, in order to function. Also, any means for pivoting the tip of a following torch requires some control signals. If the utilities were supplied directly to the torches, and the control signals supplied directly to the pivoting means, the lines would all become entangled as the following torch pivoted about the lead torch.

It is another object of this invention to supply these utilities and control lines and enable the following torch to pivot about a lead torch without the various lines becoming entangled.

It is yet a further object of this invention to provide a double torch carrier which is adaptable to carry cutting tools requiring a variety of utilities for operation.

It is still another object of this invention to provide a torch carrier adaptable to carry a plurality of cutting tools.

SUMMARY OF THE INVENTION

Accordingly, we have invented a cutting tool carrier for holding a plurality of cutting tools, each tool requiring certain utilities to operate. The carrier includes a body, a plurality of tool holders pivotally mounted within the body and each adapted to receive a cutting tool, first pivot means enabling the body to be rotated about the axis of a first tool holder, second pivot means for rotating each of the remaining tool holders within the body, control means for transmitting control signals for the second pivot means through the first tool holder, said control means operative continuously regardless of any motion between the first tool holder and the body, and utility means for transmitting tool utilities first through the first tool holder, then through the body, and then through each of the remaining tool holders, said utility means operative continuously regardless of any motion between the tool holders and the body. Preferably the cutting tool carrier includes first and second torch holders adapted to receive a pair of plasma cutting torches. We have invented a double torch cutting apparatus which includes in combination the tool carrier described above with a first and second cutting torch mounted within the first and second torch holders respectively. Preferably the first torch is a straight or contour cutting torch and the second torch is a bevel cutting torch. We have also invented a method of cutting a workpiece along a predetermined path in which a straight cut and a bevel cut are made with one pass of a cutting tool. The method includes the steps of providing in one carrier a first torch for making a straight cut and a second torch for making a bevel cut, both torches pivotally mounted therein, moving the carrier in a controlled manner such that the first torch cuts the workpiece along the predetermined path, rotating the carrier laterally about an axis lengthwise through the centerline of the first torch in a controlled manner whereby the second torch follows the path cut by the first torch, and rotating the second torch within the body to maintain the angle of the bevel cut made by the second torch at a constant.

DESCRIPTION OF THE PREFERRED EMBODIMENT

Figure 1:
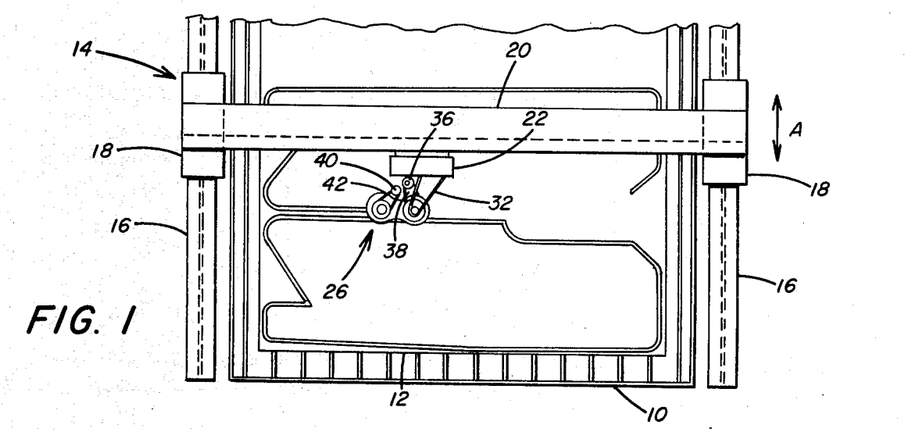
FIG. 1 is a top view of a workpiece cutting apparatus including the cutting tool carrier.
Figure 2:
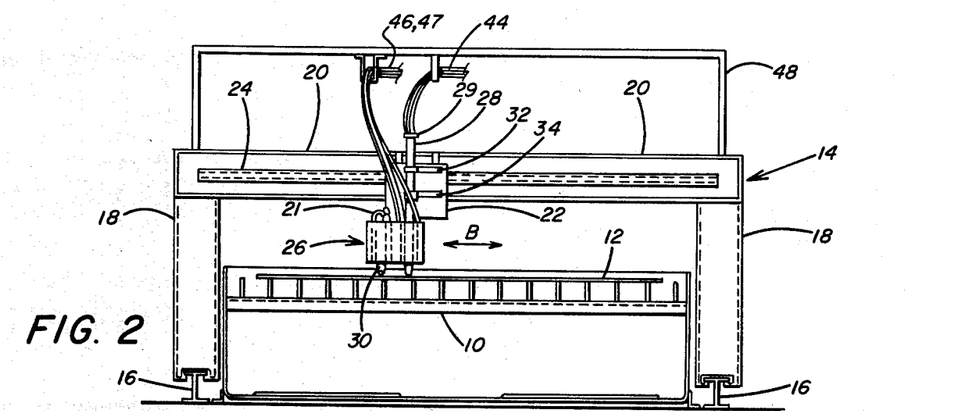
FIG. 2 is an end view of the apparatus shown in FIG. 1.
Figure 3:
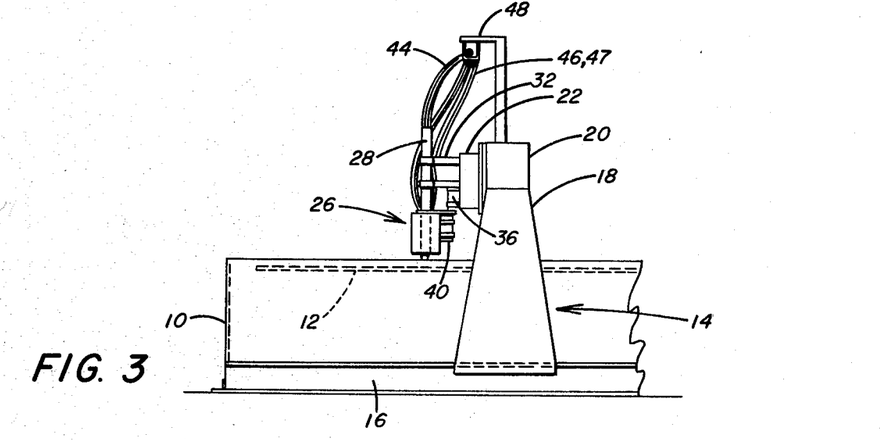
FIG. 3 is a side view of the apparatus shown in FIG. 1.

Referring now to FIGS. 1, 2, and 3, a standard torch cutting apparatus includes a table 10 to support a workpiece 12 and a movable carriage 14 located above the table 10 and supported by a pair of rails 16. The carriage 14 includes a pair of side supports 18 and a cross beam 20 mounted to and supported by the side supports 18. Each side support 18 rests on a corresponding rail 16 and is movable along the rail 16 in the direction shown in FIG. 1 by the double-headed arrow A. A traveling support 22 is mounted in a track 24 in the cross beam 20 and is movable along the cross beam 20 in the direction shown in FIG. 2 by the double-headed arrow B.

A cutting tool or torch carrier 26 carries a plurality of cutting tools or torches, preferably a first or lead torch 28 and a second or following torch 30, both pivotally mounted therein. The torches used are preferably plasma torches. A pair of support arms 32, 34 are mounted to the traveling support 22 and are releasably attached to the lead torch 28. Thus, the torch carrier 26 and associated torches 28, 30 are supported by and move along with the traveling support 22. By a combination of the movement of the carriage 14 along the rails 16 and the traveling support 22 along the track 24 of the cross beam 20, the double torch carrier 26 can move across the workpiece 12 along any desired path.

As will be described later in more detail, the torch carrier 26, controlled by a first motor 36 mounted to the traveling support 22, can pivot about the axis of the lead torch 28. A drive pulley on the first motor 36 is connected to the torch carrier 26 by a first belt 38 to pivot the torch carrier 26 and thus move the following torch 30 about the lead torch 28. A second motor 40 is mounted to the torch carrier 26. The position of the tip of the following torch 30 is controlled by a second belt 42 mounted to a drive pulley on the second motor 40.

The various utilities for the lead torch 28 are supplied directly to the top 29 of the lead torch 28 through a set of plastic or metal tubes, the lead torch utility pipes 44. The utilities for the following torch 30 and the control signals for the second motor 40 are supplied through the torch carrier 26 and to the following torch 30 and second motor 40 by the following torch utility pipes 46 and the second motor control signal wires 47 respectively. In the preferred embodiment, each torch requires the following utilities: shield gas, cutting gas, and power and water in and out. An upper support member 48 holds the utility pipes and the control wires 44, 46, 47 above the movable carriage 14. As will be described later, the following torch 30 can pivot 360° around the lead torch 28 without two sets of utility pipes 44, 46 and the control wires 47 becoming entangled. As shown in FIG. 2, a number of pipes 21 are connected between the torch carrier 26 and the top of the following torch 30.

In operation, the lead torch 28 is moved along a predetermined path and cuts the workpiece 12 into the desired pattern. Preferably, this lead torch 28 makes a cut into the metal with straight edges, while the following torch 30 makes a cut at an angle or a bevel. The first motor 36 pivots the torch carrier 26 in a controlled manner that the following torch 30 follows precisely the initial cut made by the lead torch 28, and the second motor 40 pivots the following torch 30 within the torch carrier 26 adjusting the position of the following torch tip to keep the angle of the bevel cut constant. Thus, with one pass of the movable carriage 14 the metal can be cut into a desired shape and the cut edges can be beveled.

Referring to FIGS. 4 to 16, the torch carrier 26 includes a body 50, with top and bottom surfaces 52, 54, and outer wall 56. The body 50 also includes a first pulley 57 rigidly mounted by a neck portion 59 to the body top surface 52. The body 50, which resembles two hollow cylinders joined together along one edge, includes a first inner wall 58 of circular cross section which extends through the body from the first pulley 57, along the neck 59, and to the bottom surface 54. The body 50 also includes a second inner wall 60 of circular cross section which extends from the top surface 52 to the bottom surface 54 and is parallel to but separate from the first inner wall 58. Although, for illustrative purposes, FIG. 4 shows two torches installed in the torch carrier 26, it is to be understood that they are not part of the torch carrier 26 per se but are installed when the torch carrier 26 is in operation.

A first or lead cutting tool or torch holder 62 is pivotally mounted within the body 50 immediately adjacent the first inner wall 58 on several ring bearings 64. The lead torch holder 62 comprises essentially a right circular cylinder with a first circular bore 66 extending from its top surface 63 through its length. A second or following cutting tool or torch holder 68 is pivotally mounted within the body 50 immediately adjacent the second inner wall 60 on several ring bearings 64. The following torch holder 68 is also a right circular cylinder with a second circular bore 70 extending from its top surface 69 through its length. However, circumscribing that portion of the following torch holder 68 which extends above the top surface 52 of the torch carrier 26 is an integral flanged pulley-like section or second pulley 72, which is adapted to receive the second belt 42 connected to a drive pulley 76 on the second motor 40.

The body 50 and the torch holders 62, 68 are made out of an insulator material, preferably Bakelite plastic because, as will be described later, they each carry electrical current conducting elements.

Figure 4:
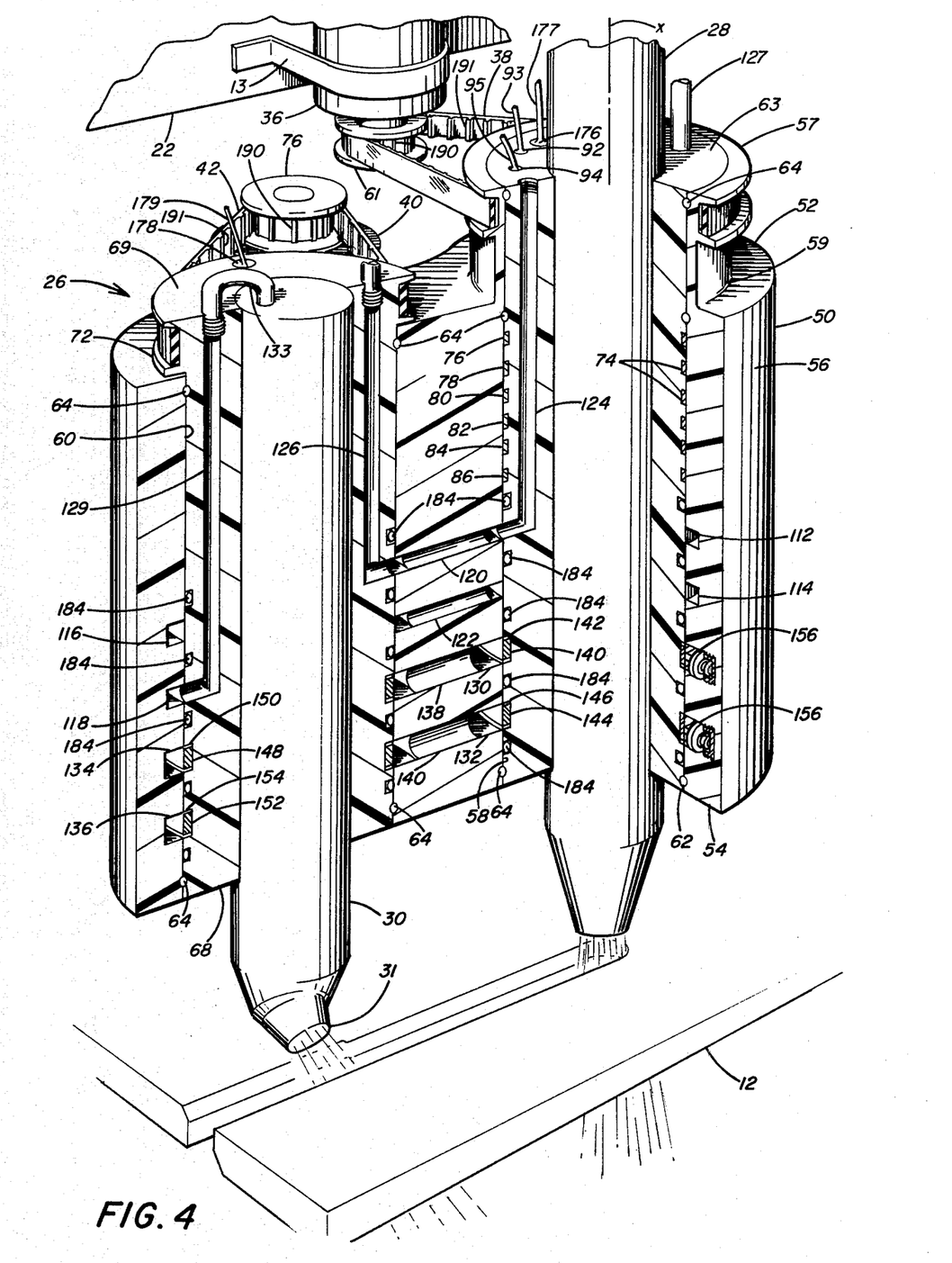
FIG. 4 is a perspective view, partially in section, of the cutting tool carrier connected to the first motor.

Referring to FIG. 4, the lead torch 28, which is not a part of the double torch carrier 26, is inserted into torch carrier 26 in the first bore 66 and, as will be described later in connection with FIGS. 18-20, mounted securely to the lead torch holder 62. Similarily, the following torch 30, also not a part of the torch carrier 26, is inserted into the second bore 70 and mounted securely to the following torch holder 68. It can be seen that the position of the torches 28, 30 remains fixed with respect to the corresponding torch holder 62, 68, and that the torch holders are free to move with respect to the body 50 of the torch carrier 26.

FIG. 4 also shows that the first pulley 57 is connected to a drive pulley 61 on the first motor 36 by the first belt 38. The first motor 36 is mounted to the traveling support 22 by one or more mounting brackets 13.

Referring again to FIGS. 4-16, a number of metal collector rings are mounted about the periphery of the lead torch holder 62 in separate annular slots 74. A like number of control brushes are located in the body 50 and each extends from the first inner wall 58 to the outer surface 56 whereby one brush makes electrical contact with one collector ring. Each collector ring has associated with it a hollow passage which extends through the lead torch holder 62 from immediately adjacent the back of the collector ring to the top surface 63 of the lead torch holder 62. Each collector ring has a control lead, preferably a silver wire, connected to the ring by soldering or the like, which passes through the associated passage to the surface 63 of the lead torch holder. The control brushes supply the electrical signals necessary to control the operation of the second motor 40 and are electrically connected to the second motor 40 in any conventional manner, such as by separate wires. In the preferred embodiment the second motor 40 requires the following signals: Forward, first lead, neutral, ground, second lead, and reverse. Accordingly, the lead torch holder 62 includes a forward 76, first lead 78, neutral 80, ground 82, second lead 84, and reverse 86 collector ring, an associated forward 88, first lead 90, neutral 92, ground 94, second lead 96, and reverse 98 hollow passage, and an associated forward 89, first lead 91, neutral 93, ground 95, second lead 97, and reverse 99 control lead. Likewise, the body 50 has located therein an associated forward 100, first lead 102, neutral 104, ground 106, second lead 108 and reverse 110 control brush. If the second motor 40 required more or less control signals for operation, the torch carrier would include a corresponding number of collector rings, control brushes, and hollow passages.

Thus, it can be seen that the control brushes will continually make electrical contact with the rings and supply the required signals to the second motor 40 as the body 50 moves with respect to the lead torch holder 62. The control wires 47 (shown in FIGS. 1-3) which supply the required signals to the rings (76, 78, 80, 82, 84, 86) are each electrically connected to the corresponding control lead (89, 91, 93, 95, 97, 99) in the vicinity of the top surface 63 of the lead torch holder 62. The top of each passage (88, 90, 92, 94, 96, 98) is screw threaded to receive a threaded pipe which carries and protects the individual control wires 47. The threaded pipes are inserted after the control wires 47 are connected to the control leads.

The body 50 also includes a pair of parallel annular channels 112, 114 located along the first inner wall 58 and adjacent the lead torch holder 62. Because, as will be described in more detail later, these channels carry the cutting gas and shield gas to the following torch 28, they will be referred to as the first or lead cutting gas channel 112 and the first or lead shield gas channel 114. The body 50 also includes a pair of channels, the second or following cutting gas channel 116 and the second or following shield gas channel 118, located along the second inner wall 60 and adjacent the following torch holder 68, and on the same level in the body 50 as the corresponding channel along the first inner wall 58. A joint cutting gas channel 120, which is a substantially straight channel, extends through the body 50 and connects the cutting gas channels 112, 116 together. A joint shield gas channel 112 extends through the body 50 and connects the shield gas channels 114, 118 together.

A first or lead cutting gas passage 124 extends through the lead torch holder 62 from its top surface 63 and ends immediately adjacent to and in contact with the lead cutting gas channel 112. A second or following cutting gas passage 126 extends through the following torch holder 68 from a position immediately adjacent to and in contact with the following cutting gas channel 116 to its top surface 69. Similarly, a first or lead shield gas passage 128 extends through the lead torch holder 62 between its top surface 63 and the lead shield gas channel 114, and a second or following shield gas passage 129 extends through the following torch holder 68 between its top surface and the following shield gas channel 118.

The top portion of the lead cutting passages 124 and the top portion of the lead shield gas passage 128 are each screw threaded to receive one of the corresponding lead torch utility pipes 44. The shield gas utility pipe 127 shown in FIG. 4 is exemplary. The top portion of the following cutting gas passage 126 and the top portion of the following shield gas passage 129 are also screw threaded to receive a pipe which is supplied to the corresponding utility on the top of the following torch 30. The gas pipe 133, shown in FIG. 4, which connects the following shield gas passage 129 to the following torch 30 is exemplary. It is to be understood that appropriate gas and water pipes will connect the top of each passage in the following torch holder 68 to the following torch 30. These are shown generally as item 21 in FIG. 2.

Because the cutting gas channels 112, 116 and shield gas channels 114, 118 completely encircle the torch holders 62, 68, the gas passages (124, 126, 128, 129) through the torch holders 62, 68 will always be in contact with their adjacent channel. Thus, the flow of gas through the lead torch holder 62, body 50, and following holder 68 will be continuously maintained regardless of any change in position between the torch holders 62, 68 and the body 50.

The body 50 includes another pair of parallel annular channels 130, 132 located along the first inner wall 58 and adjacent the lead torch holder 62. These channels will be referred to as the first or lead water inlet channel 130 and the first or lead water outlet channel 132. The body 50 includes corresponding second or following water inlet and outlet channels 134, 136 along the second inner wall 60 and on the same level as the lead water channels 130, 132. A joint water inlet channel 138, which is a substantially straight channel, extends through the body 50 and connects the lead and following water inlet channels 130, 134 together. A joint water outlet channel 140 extends through the body 50 and connects the lead and following water outlet channels 132, 136 together.

A first or lead power-in collector ring 140 is mounted about the periphery of the lead torch holder 62 and adjacent the lead water inlet channel 130 in a first annular slot 142. A first or lead power-out collector ring 144 is mounted in a second annular slot 146 in the lead torch holder 62 and adjacent the lead water outlet channel 132. A second or following power-in collector ring 148 is mounted in the following torch holder 68 in a third annular slot 150 and adjacent the following water inlet channel 14. A second or following power-out collector ring 152 is mounted in the following torch holder 68 in a fourth annular slot 154 and adjacent the following water outlet channel 136.

Figure 14:
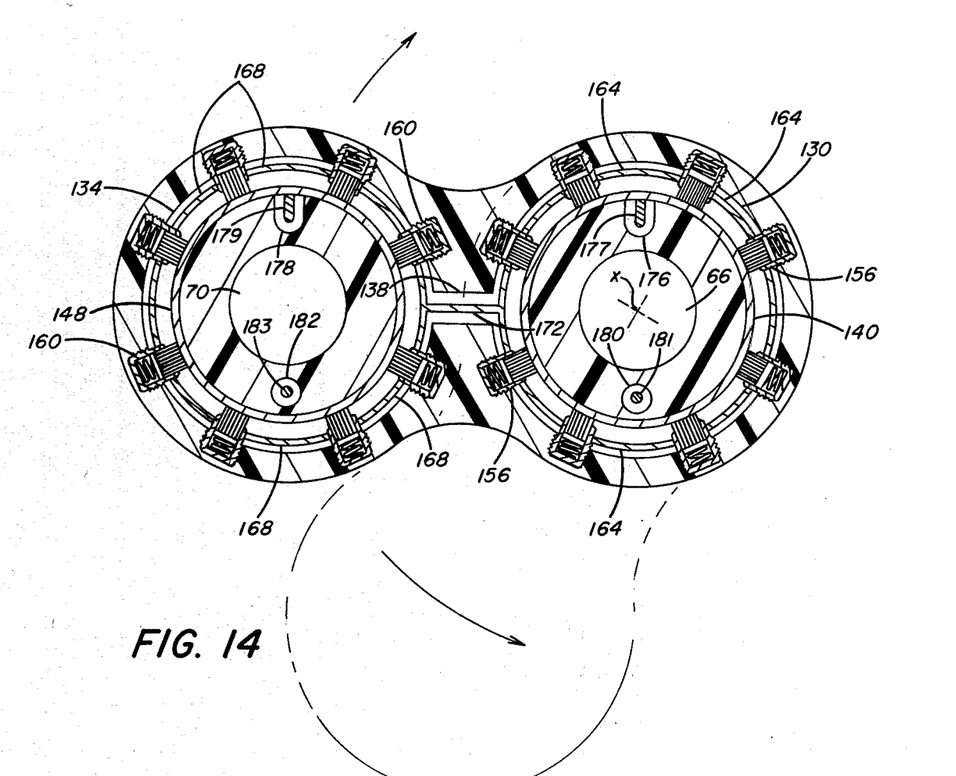
FIG. 14 is a section taken along lines XIV—XIV in FIG. 5.
Figure 15:
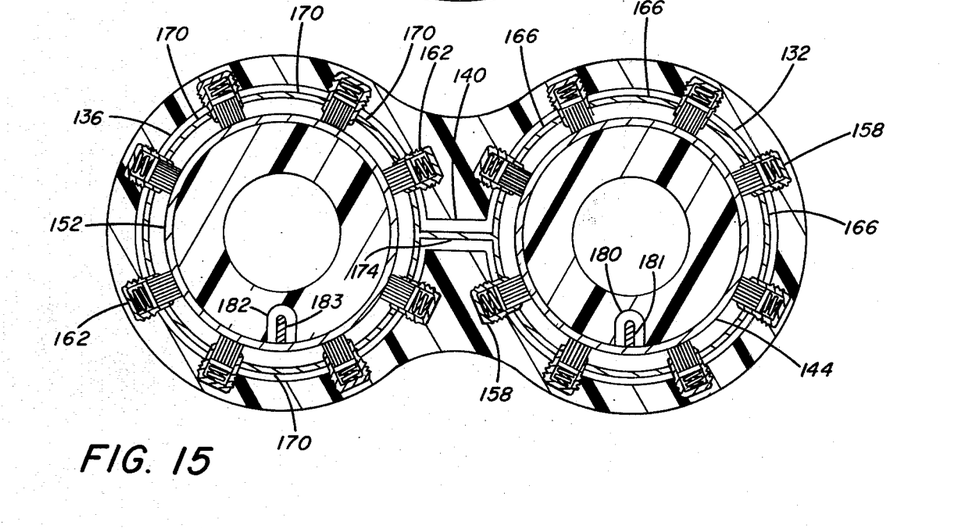
FIG. 15 is a section taken along lines XV—XV in FIG. 5.

Referring now to FIGS. 4, 14, and 15, a plurality of power brushes 156 are each spring mounted into the body 50 in the lead water inlet channel 130 and are spaced around and make electrical contact with the lead power-in collector ring 140. Similarly, a plurality of power brushes 158, 160, 162 are spring mounted into the body 50 in the lead water outlet channel 132, the following water inlet channel 134, and the following water outlet channel 135, and are spaced around and make electrical contact with the lead power-out collector ring 144, the following power-in collector ring 148, and the following power-out collector ring 152 respectively.

Sections of wire 164 extend between adjacent pairs of power brushes 156 along the lead water inlet channel 130 and electrically join the power brushes together. Each section of wire 164 may be secured to each power brush 156 by soldering or other similar method. Adjacent pairs of power brushes 158, 160, 162 in the remaining water channels 132, 134, 136 are likewise joined together electrically by sections of wires 166, 168, 170. A first connecting wire 172 is located in the joint water inlet channel 138 and is connected at one end to a section of wire 164 in the lead water inlet channel 130 and at the other end to a section of wire 168 in the following water inlet channel 134. Similarly, a second connecting wire 174, located in the joint water outlet channel 140 is connected at one end to a section of wire 166 in the lead water outlet channel 132 and at the other end to a section of wire 170 in the following water outlet channel 136. The wires 164, 166, 168, and 170 and first and second connecting wires 172, 174 are not shown in FIG. 4 for purposes of clarity.

As described earlier, the torch holders 62, 68 and body 50 are preferably made out of an insulator material such as Bakelite. This prevents short circuits between the various current carrying brushes and rings described above. If the body and torch holders were made of a conducting material, all of the rings, brushes and water carrying channels would need to be electrically isolated from each other with the necessary insulation.

Referring now to FIGS. 4 and 6–16, the first or lead power/water inlet passage 176 extends through the lead torch holder 62 from the top surface 63 and ends immediately adjacent to and in contact with the first annular slot 142. A second or following power/water inlet passage 178 extends through the following torch holder 68 from a position immediately adjacent to and in contact with the third annular slot 150 to its top surface 69. Similarily, a first or lead power/water outlet passage 180 extends through the lead torch holder 62 between its top surface 63 and the second annular slot 146, and a second or following power/water outlet passage 182 extends through the following torch holder 68 between its top surface 69 and the forth annular slot 154.

A lead power-in wire 177 is electrically connected to the lead power-in collector ring 140 by soldering or the like and extends through the lead power/water inlet passage 176 to the top surface 63 of the lead torch holder 62. Similarly, a lead power-out collector ring 144, following power-in collector ring 148 and following power-out collector ring 152 have connected electrically thereto an associated lead power-out wire 181, following power-in wire 179 and following power-out wire 183, which wires extend through the lead power/water outlet passage 180, the following power/water inlet passage 178 and the following power/water outlet passage 182, respectively.

The top portion of the lead power/water passages 176, 180 is screw threaded to receive the power and water pipes of the lead torch utility pipes 44. Each power and water pipe includes a power wire encased by a water pipe. The power wires are electrically connected to the appropriate lead power-in and power-out wires 177, 181 and the water pipes are attached to the corresponding lead power/water passage 176, 180. Similarly, the top portion of the following power/water passages 178, 182 is screw threaded to receive a pipe encasing a wire for connecting the following power-in and power-out wires 179, 183 and corresponding passages between the following torch holder 68 and the following torch 30. These water pipes connected to the following torch 30, as well as the gas pipes connecting the following torch gas passages to the following torch, are referred to collectively in FIG. 1 as item 21.

Figure 16:
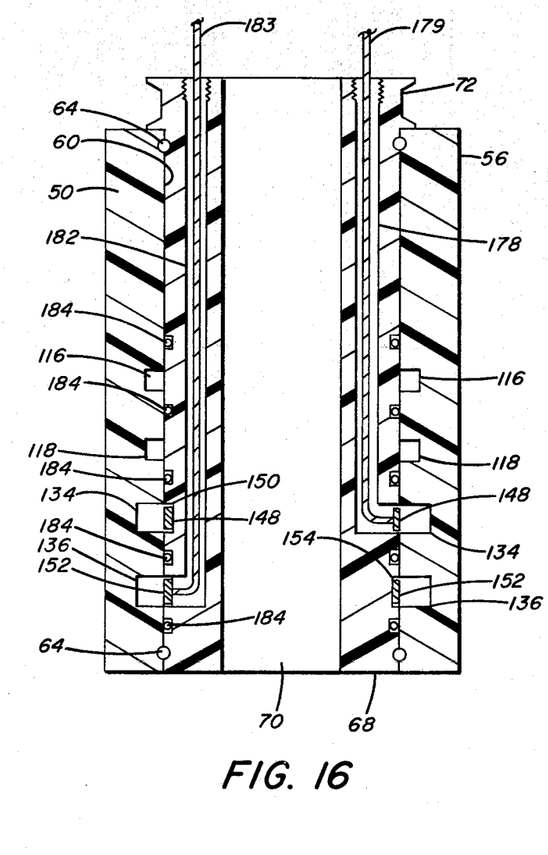
FIG. 16 is a section taken along lines XVI—XVI in FIG. 5.

Referring specifically to FIG. 16, it can be seen that the following power-in collector ring 148 is not as wide as the third annular slot 150 into which it is mounted. Because of this loose fit, water freely flows between the following water inlet channel 134 and the following power/water inlet passage 178 by passing around the following power in the collector ring 148. Likewise, the remaining power collector rings 140, 144, 152 are not as wide as the annular slots 142, 146, 154 they are mounted into and, thus, permit the flow of water around the collector ring.

In addition to flowing around the power-in and power-out collector rings 140, 144, 148, and 152, the water also flows around all the power brushes and wires which carry the DC electrical power to and from the following torch 30. Because plasma torches draw a considerable amount of current, upwards of 500 Amps, the flow of water draws off the generated heat and cools down all the current carrying items. Otherwise, the torch carriers 62, 68 and the body 50 would become overheated.

Because the water inlet and water outlet channels 130, 132, 134, 136 completely encircle the torch holders 62, 68, the power/water passages 176, 178, 180, 182 will always be in contact with their adjacent channel. Likewise, the power collector rings 140, 144, 148, 152 are always in contact with their adjacent power brush 156, 158, 160, 162. Thus, the flow of water and power through the torch carrier 26 to the following torch 30 and back will be continuously maintained regardless of any change in position between the torch holders 62, 68 and the body 50.

Mounted inside and about the periphery of each torch holder 62, 68 are a plurality of annular gas seals 184. These seals are located on either side of the gas or water carrying channels 112, 114, 116, 118, 130, 132, 134, and 136 and prevent the various gases or water from leaking between the torch holder 62, 68 and the adjacent inner wall 58, 60.

Figure 17:
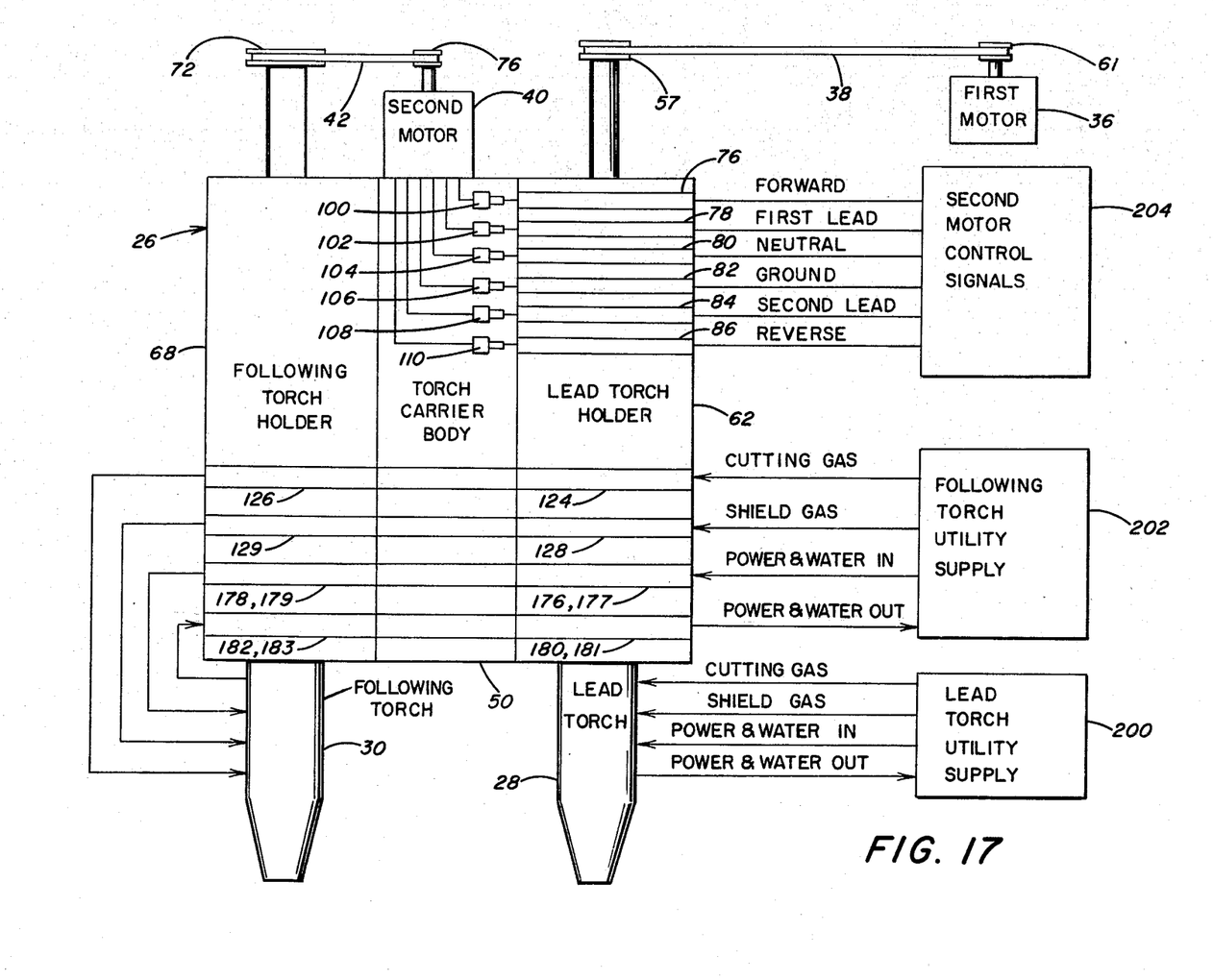
FIG. 17 is a schematic showing the paths taken by the torch utilities and the second motor control signals.

The path of flow of the various torch utilities and motor control signals can best be explained by referring to the schematic diagram in FIG. 17, with continued reference to the FIGS. 1-16 for the accompanying structure.

The lead torch 28 is mounted to the torch carrier 26 by means of the lead torch holder 62 and all the lead torch utilities are supplied directly to the lead torch 28 from a supply source 200. The following torch 30 is mounted to the torch carrier 26 by means of the following torch holder 68. However, none of the following torch utilities are supplied directly to the lead torch 28 but are supplied initially from a source 202 to the lead torch holder 62. The following torch utilities then travel through the lead torch holder 62, the body 50, and the following torch holder 68 before being supplied to the following torch 30. Likewise, the second motor control signals are supplied from a source 204 to the lead torch holder 62 and travel through the lead torch holder 62 and the body 50 before being supplied to the second motor 40. Because all of the utilities and control signals are supplied to the lead torch 28 or the lead torch holder 62, which both remain stationary with respect to the movable support 22, the torch carrier 26, and hence the following torch 30, can freely pivot about the lead torch 28 without any of the utility lines and control signals becoming entangled.

The forward signal for the second motor 40 takes the following path to reach the second motor 40: along the forward control lead 89 in the forward passage 88 in the lead torch holder 62 to the forward collector ring 76, to the forward control brush 100 in the body 50, and then directly to the second motor 40. The remaining second motor control signals (first lead, neutral, ground, second lead, and reverse) each follow a similar path along their corresponding control lead (91, 93, 95, 97, 99), passage (90, 92, 94, 96, 98), and collector ring (78, 80, 82, 84, 86) in the lead torch holder 62, the control brush (102, 104, 106, 108, 110) in the body 50, and then directly to the second motor 40.

The following torch cutting gas travels along the lead cutting gas passage 124 in the lead torch holder 62, through the lead cutting gas channel 112, the joint cutting gas channel 120, and the following cutting gas channel 116 in the body 50, along the following cutting gas passage 126 in the following torch holder 68, and then to the following torch 30. Similaly, the following torch shield gas travels along the shield gas passage 128 in the lead torch holder 62, through the lead shield gas channel 114, the joint shield gas channel 122, and the following shield gas channel 118 in the body 50, along the following shield gas passage 129 in the following torch holder 68, and then to the following torch 30.

The following torch inlet water travels down the lead power/water inlet passage 176 and around the lead power-in collector ring 140 in the lead torch holder 62, through the lead water inlet channel 130, the joint water inlet channel 138, and the following water inlet channel 134 in the body 50, around the following power-in collector ring 148 and up the following power/water inlet passage 178 in the following torch holder 68, and then to the following torch 30. The following torch outlet water travels down the following power/water outlet passage 182, around the following power-out collector ring 152, through the following water outlet, joint water outlet, and lead water outlet channels, 136, 140, 132, around the lead power-out collector ring 144, and up the lead power/water outlet passage 180 to the following torch utility supply 46.

The following torch electrical power-in travels through the lead power-in wire 177 to the lead power-in collector ring 140 in the lead torch holder 62, to the power brushes 156 and sections of wire 164 in the lead water inlet channel 130, to the wire 172 in the joint water inlet channel 138, to the power brushes 160 and sections of wire 168 in the following water inlet channel 134, to the following power-in collector ring 148 in the following torch holder 68, and through the following power-in wire 179 to the following torch 30. The following torch electrical power-out travels from the following torch 30, down the following power-out wire 183 to the following power-out collector ring 152, to the power brushes 162 and wires 170 in the following water outlet channel 136, to the wire 174 in the joint water outlet channel 140, to the power brushes 158 and wires 166 in the lead water outlet channel 132, to the lead power-out collector ring 144, and along the lead power-out wire 181 to the following torch utility supply 46.

Figure 5:
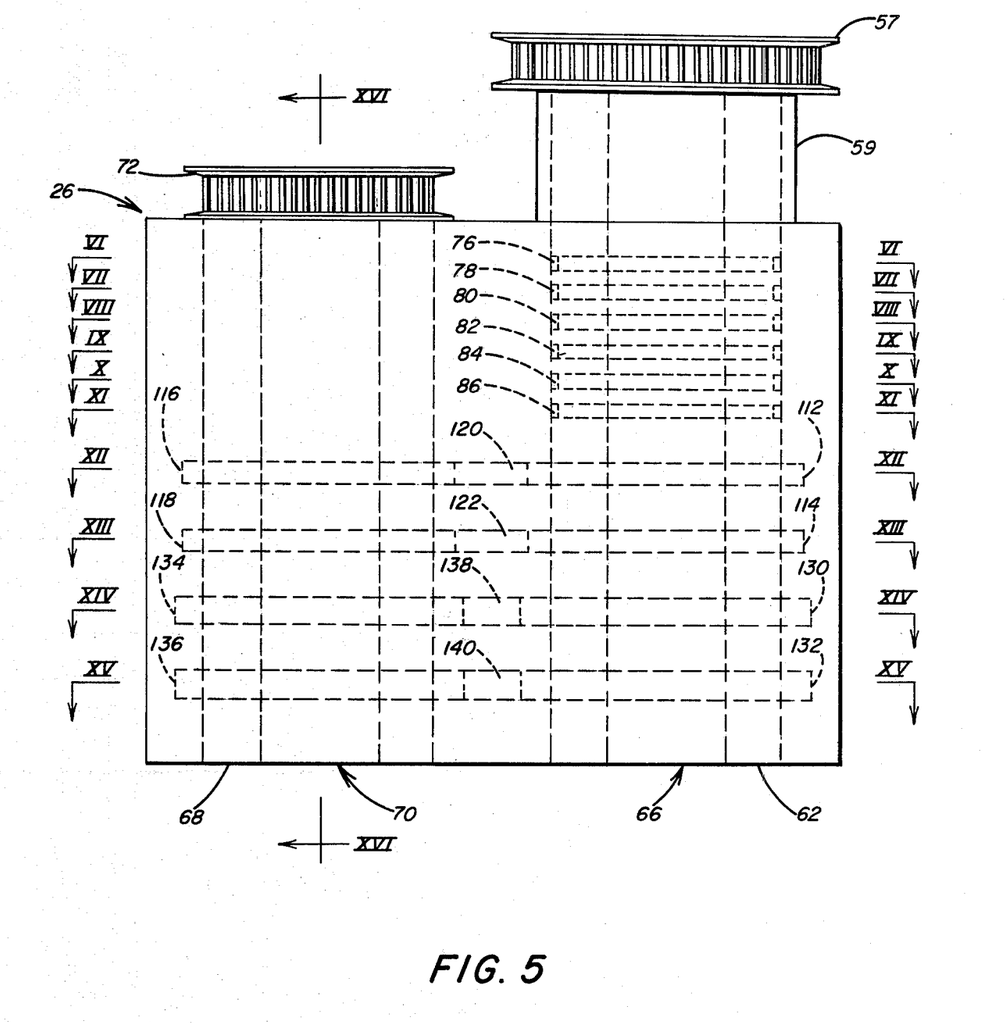
FIG. 5 is a side view of the cutting tool carrier with the tool holders, the second motor collector rings and the horizontal portions of the gas and water channels shown in phantom.
Figure 6:
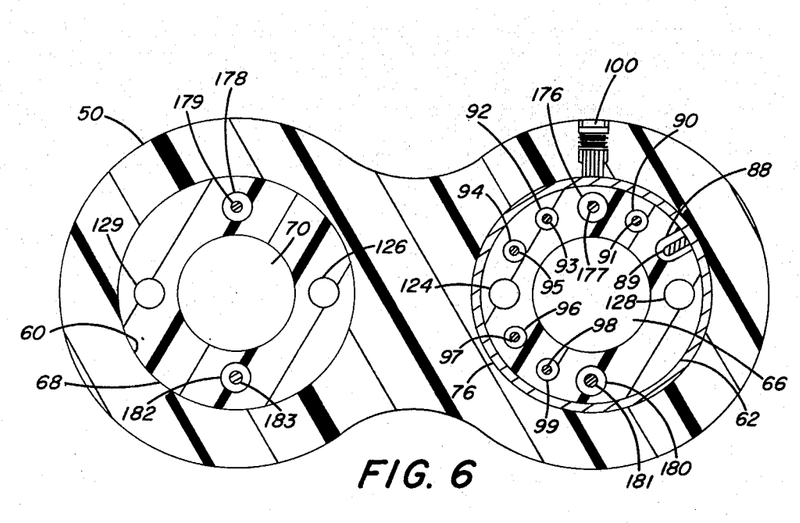
FIG. 6 is a section taken along lines VI—VI in FIG. 5.
Figure 7:
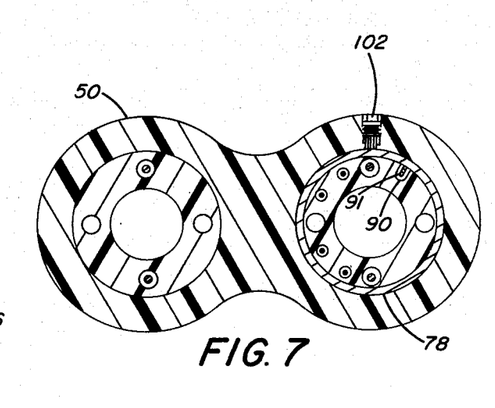
FIG. 7 is a section taken along lines VII—VII in FIG. 5.
Figure 8:
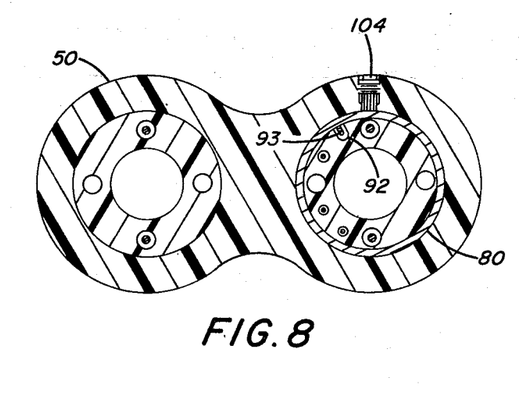
FIG. 8 is a section taken along lines VIII—VIII in FIG. 5.
Figure 9:
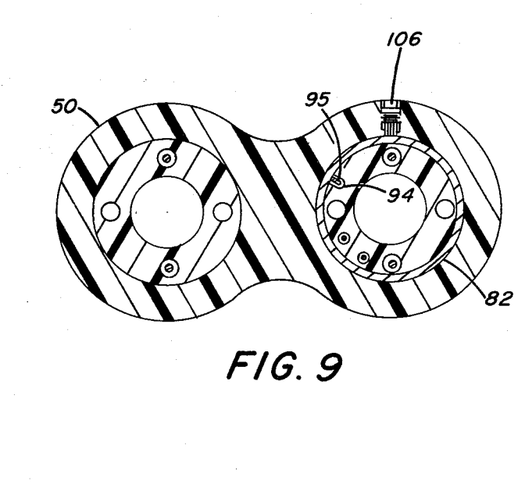
FIG. 9 is a section taken along lines IX—IX in FIG. 5.
Figure 10:
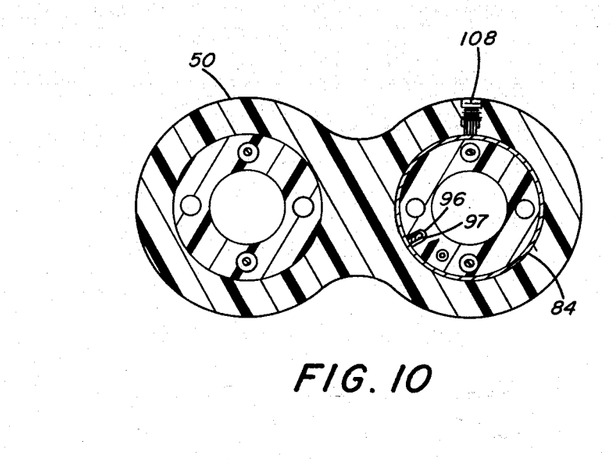
FIG. 10 is a section taken along lines X—X in FIG. 5.
Figure 11:
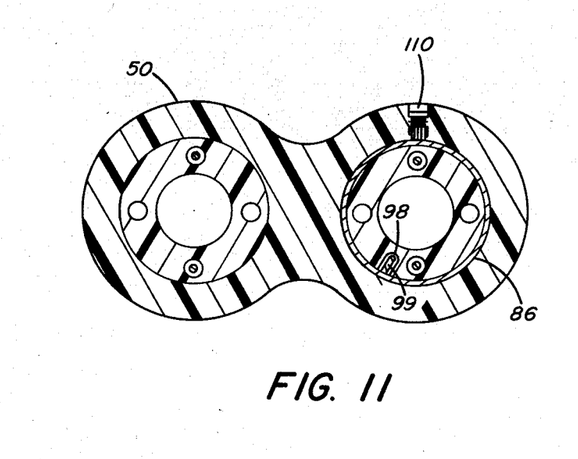
FIG. 11 is a section taken along lines XI—XI in FIG. 5.
Figure 12:
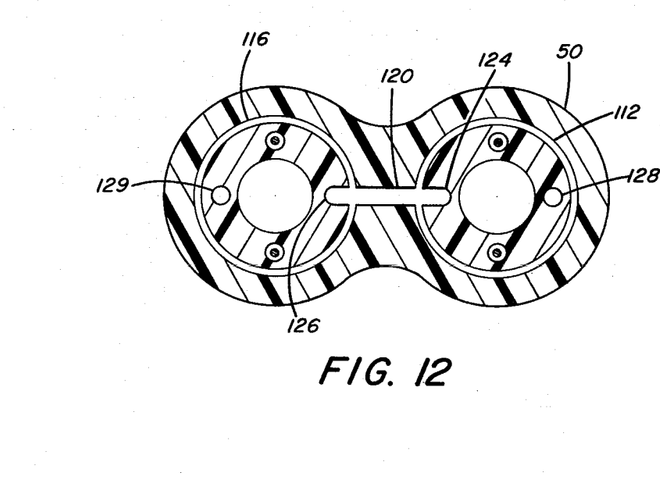
FIG. 12 is a section taken along lines XII—XII in FIG. 5.
Figure 13:
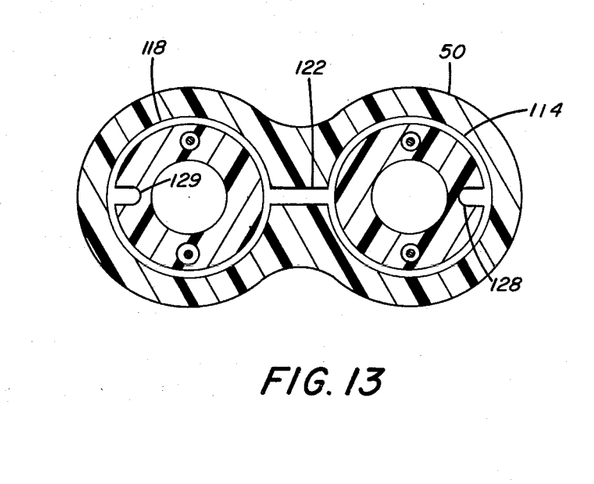
FIG. 13 is a section taken along lines XIII—XIII in FIG. 5.

The double torch carrier 26 itself is shown in FIG. 5. Prior to operation, the lead torch 28 is mounted securely inside the bore 66 in the lead torch holder 62 and the following torch 30 is mounted securely inside the bore 70 in the following torch holder 68. The torches are preferably Thermal Dynamics PCH/M-5A Cutting Torches. Tubing 21 (shown in FIG. 2) and the associated wires are connected between the following torch carrier passages 126, 129, 178 and 172, and the appropriate openings on the following torch 30. The first pulley 57 is connected to the drive pulley 61 on the first motor 36 by the first belt 38 and the torch carrier 26 is mounted to the traveling support 22 by means of the support arms 32, 34 as shown in FIGS. 1-3 and FIG. 4.

The utilities for the lead torch 28 are then connected directly to the top of the lead torch 28 and the utilities for the following torch are connected to the appropriate outlets at the top of the passages 124, 128, 176, 180 in the lead torch holder 62 as described earlier. The wires for controlling the second motor 40 are connected to the appropriate control lead (89, 91, 93, 95, 97, and 99) in the lead torch holder 62 to make electrical contact with the corresponding collector ring (76, 78, 80, 82, 84, and 86).

Figure 18:
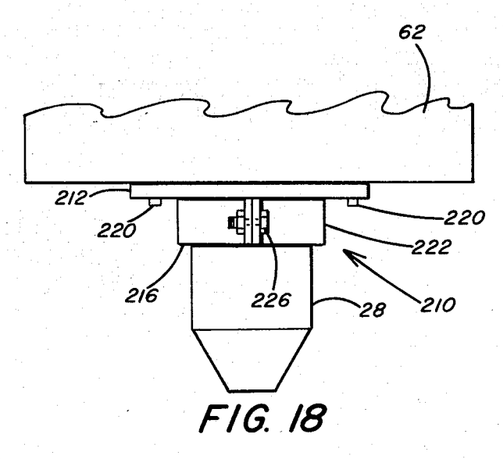
FIG. 18 is a side view of a section of the lead torch carrier with a compression fitting mounted thereto.
Figure 19:
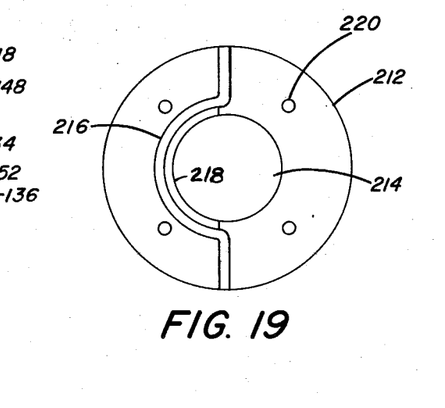
FIG. 19 is a bottom view of a portion of the compression fitting of FIG. 18.
Figure 20:
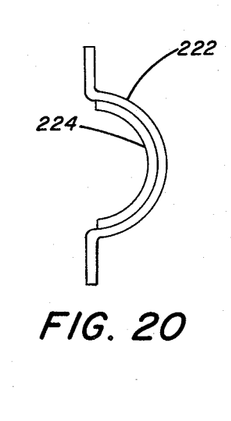
FIG. 20 is a bottom view of the remaining portion of the compression fitting of FIG. 18.

Referring now to FIGS. 18-20, a compression fitting 210 is shown which can be used to securely mount a torch to a torch holder. For illustration purposes, FIG. 18 shows a portion of the lead torch 28 and lead torch holder 62. However, the same compression fitting may be used to mount the following torch 30 to the following torch holder 68.

The compression fitting 210 includes a base plate 212 with a circular central opening 214 therein and a first flange 216 mounted to and integral with the base 212 and bordering along the central opening for one half of its circumference. The first flange 216 is lined with rubber 218 on the side adjacent the central opening. The base plate 212 is mounted by screws 220 or the like to the lead torch holder with the central opening 214 in line with and adjacent the first circular bore 66. The compression fitting 210 also includes a second flange 222 lined with rubber 224 which is releasably secured to the first flange by bolts 226 or other suitable means. The lead torch 28 is inserted in the lead torch holder 62 and between the first and second flange 216, 222 of the compression fitting 210. By tightening the bolts 226, the flanges 216, 222 are drawn together compressively holding the lead torch 28 therebetween.

In operation, the lead torch 28 remains fixed with respect to the traveling support 22. Referring now to FIGS. 4 and 14, the position of the following torch 30 is determined by the first motor 36 which through the first belt 38 turns the first pulley 57 and subsequently pivots the body 50, the following torch holder 68, and the following torch 30 laterally about the axis X lengthwise through the centerline of lead torch 28.

Because the following torch 30 is preferably a bevel cutting torch, the position of the following torch tip 31 must be adjusted as the following torch 30 pivots about the lead torch 28. As shown in FIG. 4, this is accomplished by the second motor 40 which turns the second pulley 72 and consequently the following torch holder 68 and following torch 30 by means of the second belt 42.

Both the first and second motors 36, 40 are conventional punched tape driven stepping motors such as a General Electric ½ H.P. motor equipped with encoder feedback. The evenly spaced teeth 190 on the pulleys and the corresponding teeth 191 on the belts 38, 42 determine the distance traveled by the following torch 30 and the following torch tip 31 respectively. In general, the pattern to be cut by the lead torch 28, the initial cut, is established and the motion needed by the first and second motors to move the following torch 30 such that the edges of the initial cut are beveled is calculated and encoded onto the punched tape in a conventional manner.

Referring to FIGS. 2, 4, and 5, the first pulley 57 is located far enough above the second pulley 72 to provide sufficient room for the torch carrier 26 to pivot about the lead torch 28 without the tubing 21 connected to the following torch 30, or anything else, hitting the first belt 38.

Although the torch carrier 26 has been described above with the six control signals supplied to the second motor 40 and the particular utilities (shield gas, cutting gas, and power and water in and out) supplied to the following torch 30, it is understood that the double torch carrier 26 is adaptable to be used with a different second motor or a different type of torch requiring different utilities. For example, if the particular second motor selected required seven different control signals, then seven separate collector rings would be mounted in the lead torch holder, with seven corresponding brushes mounted in the body. Similarly, the number of channels surrounding each torch holder, with accompanying passages through the body and following torch holders is determined solely by the utility requirements of the particular following torch selected.

Furthermore, while the invention has been described with reference to plasma torches, it is to be understood that any suitable cutting tool requiring utilities may be utilized. Also, more than two torches may be carried by a device within the concepts of this invention. For example, the carrier may have one lead torch with several following torches pivoting around it.

Having described a presently preferred embodiment of the invention, it is to be understood that it may otherwise be embodied within the scope of the appended claims.

We claim:

1. A carrier for cutting tools which require utilities to operate, said carrier comprising,
   (a) a body,
   (b) a plurality of tool holders pivotally mounted within the body and each adapted to receive a cutting tool,
   (c) first pivot means enabling the body to be rotated about the axis of a first tool holder,
   (d) second pivot means for rotating each of the remaining tool holders within the body,
   (e) control means for transmitting control signals for the second pivot means through the first tool holder, said control means operative continuously regardless of any motion between the first tool holder and the body, and
   (f) utility means for transmitting tool utilities first through the first tool holder, then through the body, and then through each of the remaining tool holders, said utility means operative continuously regardless of any motion between the tool holders and the body.

2. A double torch carrier which comprises:
   (a) a body,
   (b) a first torch holder pivotally mounted within the body and adapted to support a torch,
   (c) a second torch holder pivotally mounted within the body and adapted to support a torch,
   (d) first pivot means for rotating the body about the axis of the first torch holder,
   (e) second pivot means attached to the body for rotating the second torch holder within the body,
   (f) control means for transmitting control signals for the second pivot means through the first torch holder and then through the body, said control means operative continuously regardless of any motion between the first torch holder and the body, and
   (g) utility means for transmitting torch utilities first through the first torch holder, then through the body, and then through the second torch holder, said utility means operative continuously regardless of any motion between the torch holders and the body.

3. The double torch carrier of claim 2 wherein the first torch holder is a right circular cylinder which includes a first control bore therein.

4. The double torch carrier of claim 2 wherein the second torch holder is a right circular cylinder which includes a second central bore therein.

5. The double torch carrier of claim 2, wherein the first pivot means includes a first pulley mounted to the body and surrounding the first torch holder.

6. The double torch carrier of claim 2 wherein the second pivot means is a motor mounted to the body and connected to the second torch holder by a belt.

7. The double torch carrier of claim 6 further comprising a second pulley mounted around the top of the second torch holder and adapted to receive the belt.

8. The double torch carrier of claim 2 wherein the control means includes a plurality of collector rings mounted about the periphery of the first torch holder in separate annular slots, a like number of control brushes mounted within the body and adjacent to and in contact with a corresponding collector ring, a hollow passage associated with each collector ring and extending from immediately behind the collector ring to the top surface of the first torch holder, a control lead connected to each collector ring and extending through the corresponding passage, and connector means to connect the brushes to the second pivot means.

9. The double torch carrier of claim 8 wherein the connector means is a plurality of wires connected between each brush and the second pivot means.

10. The double torch carrier of claim 2 wherein the utility means for transmitting gaseous utilities includes, for each separate gas, a first annular gas channel located in the body and adjacent the first torch holder, a second annular gas channel located in the body and adjacent the second torch holder, a joint gas channel located in the body and connecting the first and second annular gas channels, a first gas passage which extends through the first torch holder and ends adjacent to and in contact with the first gas channel, and a second gas passage which extends through the second torch holder and gas adjacent to and in contact with the second gas channel.

11. The double torch carrier of claim 10 which includes separate utility means for a shield gas and a cutting gas.

12. The double torch carrier of claim 2 wherein the utility means for transmitting water and electric power in one direction includes a first annular water channel located in the body and adjacent the first torch holder, a second annular water channel located in the body and adjacent the second torch holder, a joint water channel located in the body and connecting the first and second water channels, a first water passage which extends through the first torch holder and ends adjacent to and in contact with the first water channel, a second water passage which extends through the second torch holder and terminates adjacent to and in contact with the second water channel, a first power collector ring mounted about the periphery of the first torch holder in an annular slot and adjacent to, but slightly narrower than, the first water channel and first water passage, a second power collector ring mounted about the periphery of the second torch holder in an annular slot and adjacent to, but slightly narrower than, the second water channel and second water passage, a plurality of power brushes mounted in the body in the first and second water channels and in electrical contact with the corresponding power collector ring, means to electrically connect all of the power brushes together, a first power wire connected to the first power collector ring and passing through the first water passage, and a second power wire connected to the second power collector ring and passing through the second water passage.

13. The double torch carrier of claim 12 wherein the utility means for transmitting water and electric power includes separate means for transmitting water and electric power into and out of the double torch carrier.

14. The double torch carrier of claim 12 wherein the means to electrically connect all the power brushes includes a plurality of sections of wire joining together adjacent pairs of power brushes.

15. The double torch carrier of claims 2, 3, 4, 5, 6, 8, 10, or 12 wherein the body and the first and second torch holders are made of an insulator material.

16. A double torch cutting apparatus comprising:
(a) a body,
(b) a first torch holder pivotally mounted within the body and adapted to support a torch,
(c) a second torch holder pivotally mounted within the body and adapted to support a torch,
(d) a first torch mounted within the first torch holder,
(e) a second torch mounted within the second torch holder,
(f) first pivot means for rotating the body about the axis of the first torch holder,
(g) second pivot means attached to the body for rotating the second torch holder within the body,
(h) control means for transmitting control signals for the second pivot means through the first torch holder and then through the body, said control means operative continuously regardless of any motion between the first torch holder and the body, and
(i) second torch utility means for transmitting utilities first through the first torch holder, then through the body, then through the second torch holder, and to the second torch, said second torch utility means operative continuously regardless of any motion between the torch holders and the body.

17. The double torch cutting apparatus for claim 16 wherein the first torch holder is a right circular cylinder which includes a first central bore therein.

18. The double torch cutting apparatus of claim 17 wherein the first torch is mounted in the first central bore.

19. The double torch cutting apparatus of claim 16 wherein the second torch holder is a right circular cylinder which includes a second central bore therein.

20. The double torch cutting apparatus of claim 19 wherein the second torch is mounted in the second central bore.

21. The double torch cutting apparatus of claim 16 wherein the first pivot means includes a first pulley mounted to the body and surrounding the first torch holder.

22. The double torch cutting apparatus of claim 16 wherein the second pivot means is a motor mounted to the body and connected to the second torch holder by a belt.

23. The double torch cutting apparatus of claim 22 further comprising a second pulley mounted around the top of the second torch holder and adapted to receive the belt.

24. The double torch cutting apparatus of claim 16 wherein the control means includes a plurality of collector rings mounted about the periphery of the first torch holder in separate annular slots, a like number of control brushes mounted within the body and adjacent to and in contact with a corresponding collector ring, a hollow passage associated with each collector ring and extending from immediately behind the collector ring to the top surface of the first torch holder, a control lead connected to each collector ring and extending through the corresponding passage and connector means to connect the brushes to the second pivot means.

25. The double torch cutting apparatus of claim 24 wherein the connector means is a plurality of wires connected between each brush and the second pivot means.

26. The double torch cutting apparatus of claim 16 wherein the utility means for transmitting gaseous utilities includes, for each separate gas, a first annular gas channel located in the body and adjacent the first torch holder, a second annular gas channel located in the body and adjacent the second torch holder, a joint gas channel located in the body and connecting the first and second annular gas channels, a first gas passage which extends through the first torch holder and ends adjacent to and in contact with the first gas channel, a second gas passage which extends through the second torch holder and terminates at one end adjacent to and in contact with the second gas channel and a gas pipe connecting the other end of the second gas passage to the second torch.

27. The double torch cutting apparatus of claim 26 which includes separate utility means for a shield gas and a cutting gas.

28. The double torch cutting apparatus of claim 16 wherein the utility means for transmitting water and electric power in one direction includes a first annular water channel located in the body and adjacent the first torch holder, a second annular water channel located in the body and adjacent the second torch holder, a joint water channel located in the body and connecting the first and second water channels, a first water passage which extends through the first torch holder and ends adjacent to and in contact with the first water channel, a second water passage which extends through the second torch holder and terminates at one end adjacent to and in contact with the second water channel, a first power collector ring mounted about the periphery of the first torch holder in an annular slot and adjacent to, but slightly narrower than, the first water channel and first water passage, a second power collector ring mounted about the periphery of the second torch holder in an annular slot and adjacent to, but slightly narrower than, the second water channel and second water passage, a plurality of power brushes mounted in the body in the first and second water channels and in electrical contact with the corresponding power collector ring, means to electrically connect all of the power brushes together, a first power wire connector to the first power collector ring and passing through the first water passage, a second power wire connected to the second power collector ring and passing through the second water passage, a water pipe connecting the other end of the second water passage to the second torch, and a wire located in the water pipe and connecting the second power wire to the second torch.

29. The double torch cutting apparatus of claim 28 wherein the utility means for transmitting water and electric power includes separate means for transmitting water and electric power into and out of the double torch carrier.

30. The double torch cutting apparatus of claim 28 wherein the means to electrically connect all the power brushes includes a plurality of sections of wire joining together adjacent pairs of power brushes.

31. The double torch cutting apparatus of claim 16 wherein the first and second torches are plasma torches.

32. The double torch cutting apparatus of claims 16, 17, 19, 21, 22, 24, 26, or 28 wherein the body and first and second torch holders are made of an insulator material.

33. A method of cutting a workpiece along a predetermined path in which a straight cut and a bevel cut are made with one pass of a cutting tool, comprising the steps of:
(a) providing in one carrier a first torch for making a straight cut and a second torch for making a bevel cut, both torches pivotally mounted therein,
(b) moving the carrier in a controlled manner such that the first torch cuts the workpiece along the predetermined path,
(c) rotating the carrier laterally about an axis lengthwise through the centerline of the first torch in a controlled manner whereby the second torch follows the path cut by the first torch, and
(d) rotating the second torch within the body to maintain the angle of the bevel cut made by the second torch at a constant.

* * * * *